Jan. 14, 1930. J. R. KINNEY 1,743,716
TRANSMISSION MECHANISM
Filed April 12, 1928 2 Sheets-Sheet 1
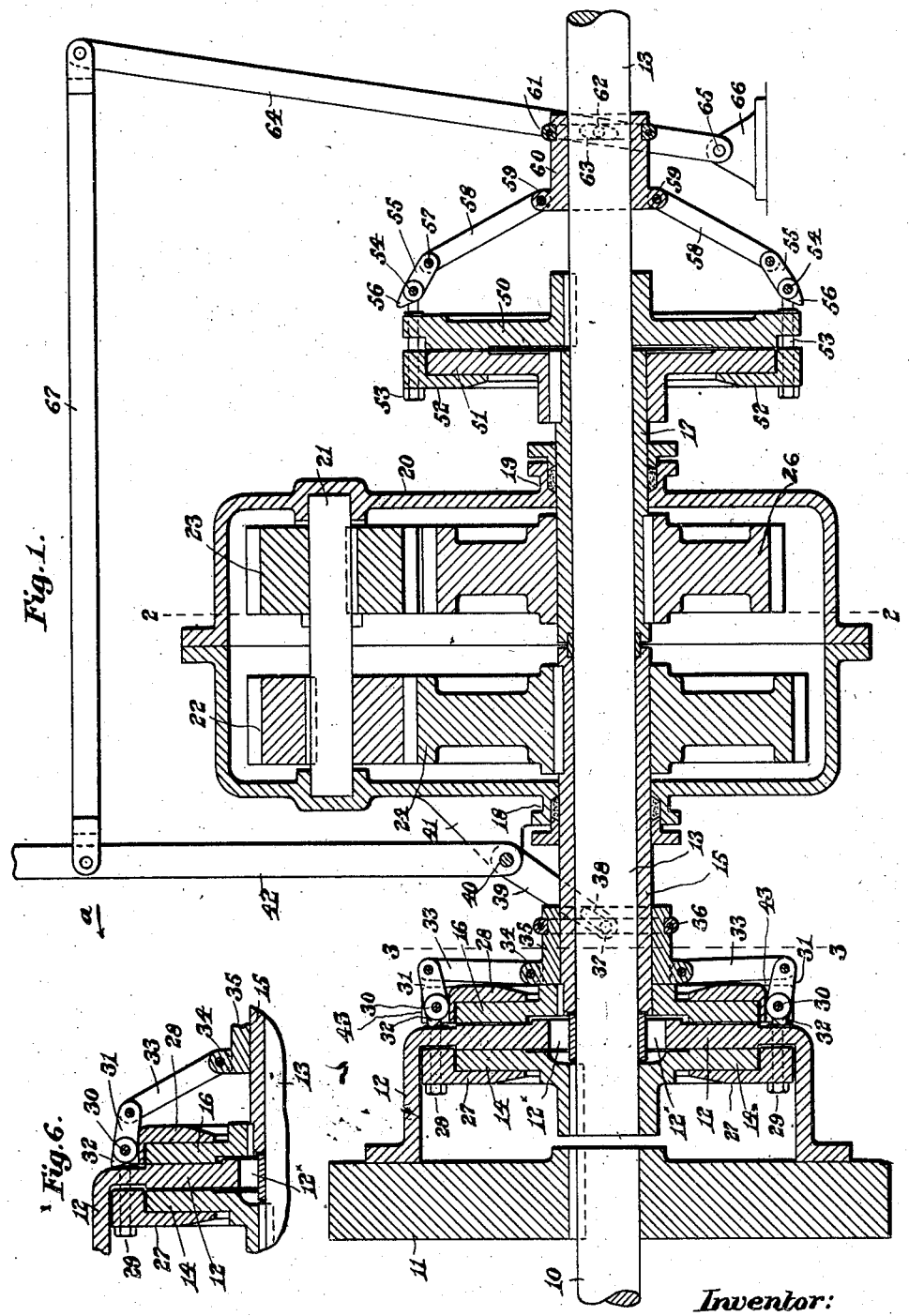
Inventor:
Justus R. Kinney,
by Walter E. Lombard, Atty.

Jan. 14, 1930.  J. R. KINNEY  1,743,716
TRANSMISSION MECHANISM
Filed April 12, 1928  2 Sheets-Sheet 2
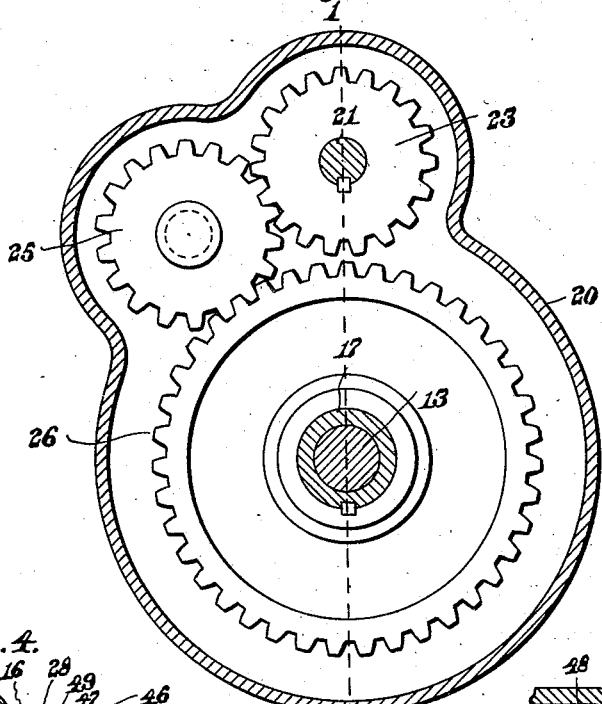
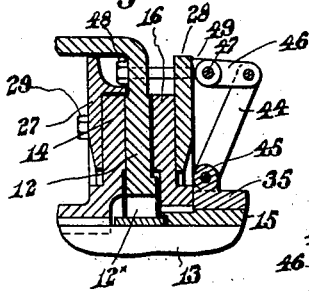
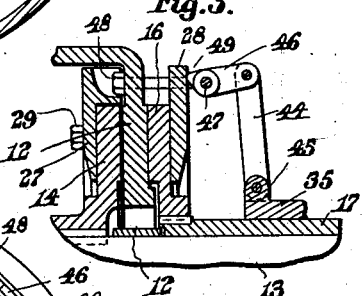
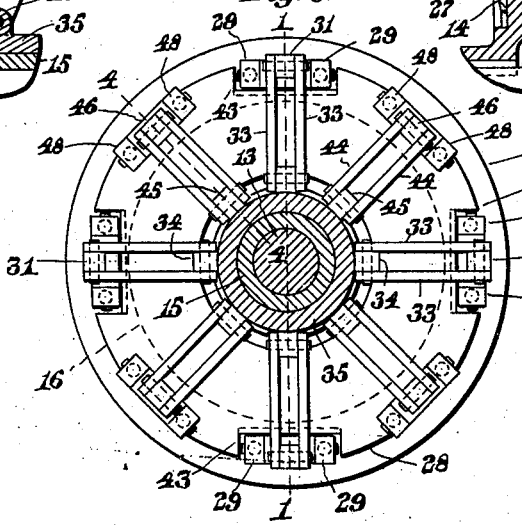
Inventor:
Justus R. Kinney,
by Walter A. Lombard.
Atty.

Patented Jan. 14, 1930

1,743,716

UNITED STATES PATENT OFFICE

JUSTUS R. KINNEY, OF JAMAICA PLAIN, BOSTON, MASSACHUSETTS

TRANSMISSION MECHANISM

Application filed April 12, 1928. Serial No. 269,443.

This invention relates to power transmission mechanism and has for its object the production of an apparatus of this character in which rotary motion from an engine shaft may be transmitted in either direction to a drive shaft alined therewith by a single shifting of clutch mechanisms surrounding the drive shaft.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a vertical section of a power transmission device embodying the principles of the present invention, the cutting plane being on line 1, 1, on Figures 2 and 3.

Figure 2 represents a transverse section of the same on line 2, 2, on Fig. 1.

Figure 3 represents a transverse section of the same on line 3, 3, on Fig. 1.

Figure 4 represents a section of a portion of the clutch mechanism on line 4, 4, on Fig. 3 and showing the elements in position for the engine shaft to rotate the drive shaft.

Figure 5 represents a similar view with the elements in position for one of the hollow shafts to be driven by the engine shaft, and Figure 6 represents a section of a portion of the clutch mechanism on line 1, 1, on Figs. 2 and 3, showing the elements in position for the hollow shaft to be rotated from the engine shaft.

Similar characters indicate like parts throughout the several figures of the drawings.

In the drawings, 10 is an engine shaft having mounted thereon a fly wheel 11 to one face of which is secured a cup-shaped plate 12.

The shaft 10, fly wheel 11 and plate 12 rotate together and in one direction only.

Alined with the engine shaft 10 but separated therefrom is a drive shaft 13, one end of which extends through the plate 12 and is surrounded by supporting rollers 12ˣ.

Within the cup-shaped plate 12 and keyed to the drive shaft 13 is a disk 14 which has a slight movement endwise of said drive shaft so that one face thereof may be forced into contact with the inner face of the plate 12.

Surrounding the drive shaft 13 is a hollow shaft 15 which has keyed to one end thereof a disk 16 which has slight movement endwise of said hollow shaft 15 so that one face thereof may be forced into contact with the outer face of the plate 12.

The drive shaft 13 also has surrounding it another hollow shaft 17, one end of which is closely adjacent an end of the hollow shaft 15.

The opposite ends of the hollow shafts 15 and 17 extend through stuffing boxes 18 and 19 in a casing 20.

Within this casing 20 and rotatable in bearings formed therein is a short shaft 21 having keyed thereto gears 22, 23.

The gear 22 meshes with a gear 24 keyed to the hollow shaft 15, while the gear 23 meshes with an idler gear 25, which in turn meshes with gear 26 keyed to the hollow shaft 17.

By means of this train of gearing rotary movement of the hollow shaft 15 in one direction causes rotary movement of the hollow shaft 17 in the opposite direction.

Bearing against the inner face of the disk 14 is a ring 27 while a similar ring 28 contacts with the outer face of the disk 16.

Extending through the ring 27 and plate 12 are a plurality of headed bolts 29 to the outer ends of which are pivoted at 30 the cam levers 31.

Each cam lever has a toe 32 which is adapted to bear against the outer face of the plate 12 and by means of ring 27 force the disk 14 into frictional contact with the plate 12.

When the disk 14 is in such frictional contact with the plate 12, it is obvious that the rotary movement of the engine shaft 10 will be transmitted to the drive shaft 13.

It is also evident that when the disk 14 is free from contact with the plate 12 no such rotary movement will be transmitted from the engine shaft to said drive shaft.

To the outer ends of cam levers 13 are pivotally connected ends of toggle links 33, the opposite ends of which are connected to ears 34 formed upon a sleeve 35 slidable lengthwise of the hollow shaft 15.

In an annular groove formed in the periphery of the sleeve 35 is a ring 36 having oppositely disposed trunnions 37 extending through slots 38 in levers 39 secured to a pivot pin 40 adapted to oscillate in bearings formed in a projection 41 on one end of the casing 20.

The levers 39 are moved about the axis of pivot 40 by means of an actuating lever 42 secured to said pivot.

The outer ends of the bolts 29 and the cam levers 31 are disposed in recesses 43 formed in the periphery of the ring 28 so that when the cam levers 31 are actuated they have no effect upon the ring 28.

To effect a movement of the ring 28 other toggle mechanism is used which is operated from the same slidable sleeve 35.

This toggle mechanism consists of the links 44 pivoted at one end to the ears 45 on the sleeve 35, the opposite ends of these links being pivoted to the outer ends of cam levers 46 pivoted at 47 to the outer ends of the headed bolts 48 extending through the plate 12, and the ring 28.

The cam levers 46 are disposed intermediate the cam levers 31 and each has a toe 49 formed thereon which is adapted to bear against the outer face of the ring 28 to force the disk 16 into frictional contact with the outer face of the plate 12.

It will thus be seen that by moving the sleeve 35 in one direction the disk 14 will be brought into frictional contact with the plate 12 while the disk 16 is being removed from contact with said plate, and when the sleeve 35 is moved in the opposite direction, the disk 16 will be brought into frictional contact with plate 12 and the disk 14 removed from contact therewith.

In an intermediate position of the sleeve 35 both disks will be free from contact with the plate 12 and the engine shaft may continue to rotate without transmitting any rotary movement either to the drive shaft 13 or the hollow shaft 15.

When the disk 16 is contacting with the plate 12 the hollow shaft 15 will be rotated in the same direction as the engine shaft 10 and this rotary movement of the shaft 15 will through the train of gearing in the casing 20 transmit a rotary movement to the hollow shaft 17 in the opposite direction.

The drive shaft 13 has keyed thereto a plate 50 which is beyond the outer end of the hollow shaft 17 which hollow shaft has keyed thereto a disk 51 having slight movement endwise of said hollow shaft 17.

Contacting with one face of the disk 51 is a ring 52 which has a plurality of bolts 53 extending through said ring and also through the plate 50.

These headed bolts 53 have pivoted thereto at 54 cam levers 55 having toes 56 at one end and at the opposite end pivots 57 by which they are connected to links 58.

The opposite ends of the links 58 are pivotally connected to ears 59 on a sleeve 60 slidable lengthwise of the drive shaft 13.

In the periphery of this sleeve 60 is a groove in which is mounted a ring 61 having oppositely disposed trunnions 62 extending into grooves 63 formed in an actuating lever 64 pivoted at 65 to some fixed member 66.

To the upper end of this lever 64 is articulated one end of a connector 67, the opposite end of which is articulated to the actuating lever 42.

When the sleeve 60 is moved toward the plate 50 the toes of the levers 55 will come into contact with the face of the plate 50 and cause the disk 51 to be forced into frictional contact with the plate 50.

By referring to Fig. 1 it will be noted that if the actuating lever 42 is moved in the direction of the arrow $a$ the sleeve 35 will be moved to the right and this will cause the toes 32 to be removed from contact with the plate 12 thereby disengaging the disk 14 from the plate 12.

This same movement of the lever 42 in the direction of the arrow $a$ will cause the sleeve 60 to be moved to the left of Fig. 1 and cause the toes 56 of the levers 55 to come into contact with the plate 50 and draw the disk 51 into frictional contact with said plate 50.

This operation will prevent the drive shaft 13 from being rotated from the engine shaft and will at the same time form a driving connection between the hollow shaft 17 and the drive shaft 13.

At the same time, the movement of the actuating lever 42 in the direction of the arrow $a$ will cause the toes 49 to bear against the ring 28 and force the disk 16 into contact with the plate 12, thereby forming a driving connection between said plate and the hollow shaft 15 so that the rotary movement of the engine shaft will be transmitted to the hollow shaft 15.

By means of this mechanism the various disks 14, 16, 51, may be moved into a position whereby there will be no driving connection between the engine shaft 10 and the drive shaft 13, or a driving connection may be made between the engine shaft 10 and drive shaft 13 to cause said drive shaft to be rotated in one direction, or the drive shaft may be disconnected from the engine shaft and rotary movement in an opposite direction transmitted to said drive shaft through the hollow shafts 15, 17, and the reversing gears disposed in the casing 20.

This makes a simple but very effective mechanism for imparting rotary motion in one direction to a propeller or similar device, or very quickly reversing the movement of said propeller when such reversed movement is required.

It is believed that the operation and many advantages of the invention will be understood without further description.

Having thus described my invention, I claim:—

1. The combination of an engine shaft; a drive shaft alined therewith and immovable endwise, said shafts being disconnected from each other under normal conditions; two hollow shafts surrounding said drive shaft immovable endwise and one of which is adapted to be driven from the engine shaft; means for transmitting rotary motion from one hollow shaft to the other; and mechanism for transmitting rotary motion to said drive shaft from either said engine shaft or one of said hollow shafts, including clutches operable by collars slidable lengthwise of drive shaft and one of said hollow shafts.

2. The combination of an engine shaft; a drive shaft alined therewith and immovable endwise, said shafts being disconnected from each other under normal conditions; two hollow shafts surrounding said drive shaft immovable endwise; connections between said hollow shafts for rotating them in opposite directions; means for making a driving connection between one hollow shaft and the drive shaft; and clutch mechanism for simultaneously connecting the other hollow shaft to and disconnecting the drive shaft from the engine shaft or simultaneously connecting the drive shaft to and disconnecting said other hollow shaft from the engine shaft.

3. The combination of an engine shaft; a drive shaft alined therewith and immovable endwise, said shafts being disconnected from each other under normal conditions; two hollow shafts surrounding the drive shaft and rotatable in opposite directions; and mechanism for simultaneously making a driving connection between one hollow shaft and the engine shaft and the other hollow shaft and the drive shaft and at the same time disconnecting the drive shaft from said engine shaft said mechanism including clutches operable by collars slidable on said drive shaft and one of said hollow shafts.

4. The combination of an engine shaft; a drive shaft alined therewith and immovable endwise, said shafts being disconnected from each other under normal conditions; two hollow shafts surrounding said drive shaft immovable endwise; means for transmitting rotary motion from one hollow shaft to the other; means for transmitting rotary motion to said drive shaft from one hollow shaft; a friction plate rotatable with said engine shaft; a disk keyed to said drive shaft and movable thereon into contact with one side of said plate; a second disk keyed to the other hollow shaft and movable thereon into contact with the opposite side of said plate; and means for moving both disks simultaneously to cause contact between one disk and said plate and disconnect the other disk from said plate.

5. The combination of an engine shaft; a drive shaft alined therewith and immovable endwise, said shafts being disconnected from each other under normal conditions; two hollow shafts surrounding said drive shaft immovable endwise; means for transmitting rotary motion in a reverse direction from one hollow shaft to the other; clutch mechanism for transmitting rotary motion to said drive shaft from one of said hollow shafts; a friction plate rotatable with said engine shaft; a disk keyed to said drive shaft and movable thereon into contact with one side of said plate; a second disk keyed to the other hollow shaft and movable thereon into contact with the opposite side of said plate; and means for moving both disks simultaneously to cause contact between either disk and said plate and separate the other disk from said plate.

6. The combination of an engine shaft; a drive shaft alined therewith and immovable endwise, said shafts being disconnected from each other under normal conditions; two hollow shafts surrounding said drive shaft immovable endwise; connections between said hollow shafts for rotating them in opposite directions; clutch mechanism for making a driving connection between one hollow shaft and the drive shaft; a plate rotatable with the engine shaft; and clutch disks coacting with the opposite sides of said plate adapted to be separately engaged therewith to rotate either the other hollow shaft or the drive shaft from the engine shaft.

7. The combination of an engine shaft; a drive shaft alined therewith and immovable endwise, said shafts being disconnected from each other under normal conditions; two hollow shafts surrounding said drive shaft immovable endwise; connections between said hollow shafts for rotating them in opposite directions; clutch mechanism for making a driving connection between one hollow shaft and the drive shaft; a plate rotatable with the engine shaft; and clutch disks coacting with the opposite sides of said plate adapted to be simultaneously moved to either connect the other hollow shaft to and disconnect the drive shaft from the engine shaft or connect the drive shaft to and disconnect said other hollow shaft from the engine shaft.

8. The combination of an engine shaft; a drive shaft alined therewith and immovable endwise, said shafts being disconnected from each other under normal conditions; two hollow shafts surrounding the drive shaft; connections between said hollow shafts for rotating them in opposite directions; a plate rotatable with the engine shaft; means on said drive shaft adapted to make a driving connection with said plate; and means for simultaneously making a driving connection between one hollow shaft and said plate and the other hollow shaft and the drive shaft and at the same time breaking the connection between the drive shaft and said plate.

9. The combination of an engine shaft rotatable in one direction; a drive shaft alined therewith and normally disconnected therefrom; a hollow shaft adapted to be connected to said engine shaft and rotated in the opposite direction; means for making a driving connection between said drive shaft and the engine shaft; and other means for simultaneously making driving connections between said hollow shaft and both said engine shaft and drive shaft.

10. The combination of an engine shaft; a drive shaft alined therewith and normally disconnected therefrom; two hollow shafts surrounding the drive shaft, one of said hollow shafts being adapted to be rotated from the engine shaft; a train of gearing transmitting rotary motion from the hollow shaft driven from the engine shaft to drive the other hollow shaft in the opposite direction; means adapted to make a driving connection between the drive shaft and the engine shaft; and means for simultaneously making a driving connection between the driven hollow shaft and the drive shaft and the driving hollow shaft and the engine shaft and at the same time disconnecting the drive shaft from the engine shaft.

11. The combination of an engine shaft; a drive shaft alined therewith and normally disconnected therefrom; two hollow shafts surrounding the drive shaft, one of said hollow shafts adapted to be rotated from the engine shaft; a train of gearing transmitting rotary motion from the hollow shaft driven from the engine shaft to drive the other hollow shaft in the opposite direction; clutch mechanisms for making a driving connection between the driven hollow shaft and the drive shaft and the driving hollow shaft and the engine shaft and at the same time disconnecting the drive shaft from the engine shaft; and a plurality of toggle members adapted to be operated simultaneously to actuate said clutch mechanisms.

12. The combination of an engine shaft; a drive shaft alined therewith; two hollow shafts surrounding said drive shaft; means for transmitting rotary motion from one hollow shaft to the other, this latter hollow shaft being provided with means whereby rotary movement may be imparted to the drive shaft; a plate rotatable with the engine shaft; a disk keyed to one hollow shaft and movable to contact with one side of said plate; a disk keyed to the drive shaft and movable to contact with the other side of said plate; a ring bearing against each disk; two sets of headed bolts extending through said plate, one set extending through each ring; two groups of cam members pivoted to said bolts one group of which are adapted to bear against said plate and the other group against the ring contacting with the disk on said hollow shaft; and means for simultaneously moving one group of cam members into action and the other out of action.

13. The combination of an engine shaft; a drive shaft alined therewith; two hollow shafts surrounding said drive shaft; means for transmitting rotary motion from one hollow shaft to the other, this latter hollow shaft being provided with means whereby rotary movement may be imparted to the drive shaft; a plate rotatable with the engine shaft; a disk keyed to one hollow shaft and movable to contact with one side of said plate; a disk keyed to the drive shaft and movable to contact with the other side of said plate; a ring bearing against each disk; two sets of headed bolts extending through said plate, one set extending through each ring; two groups of cam members pivoted to said bolts, one group of which are adapted to bear against said plate and the other group against the ring contacting with the disk on said hollow shaft; and means for simultaneously moving one group of cam members into action and the other out of action, said actuating means consisting of toggle mechanism; and an operating sleeve for said toggle mechanism movable endwise of one of said hollow shafts.

Signed by me at 746 Old South Bldg., Boston, Massachusetts, this 10th day of April, 1928.

JUSTUS R. KINNEY.